United States Patent [19]
Cosman

[11] Patent Number: 5,850,225
[45] Date of Patent: Dec. 15, 1998

[54] IMAGE MAPPING SYSTEM AND PROCESS USING PANEL SHEAR TRANSFORMS

[75] Inventor: Michael A. Cosman, South Jordan, Utah

[73] Assignee: Evans & Sutherland Computer Corp., Salt Lake City, Utah

[21] Appl. No.: 590,504

[22] Filed: Jan. 24, 1996

[51] Int. Cl.⁶ .................................................. G06T 17/20
[52] U.S. Cl. ............................................................ 345/427
[58] Field of Search .................... 395/119–120, 125–129; 345/419–420, 425–429

[56] References Cited

U.S. PATENT DOCUMENTS

| | | | |
|---|---|---|---|
| 4,714,428 | 12/1987 | Bunker et al. | 345/139 |
| 5,161,013 | 11/1992 | Rylander et al. | 348/744 |
| 5,293,233 | 3/1994 | Billing et al. | 345/425 X |
| 5,319,744 | 6/1994 | Kelly et al. | 345/436 |
| 5,353,390 | 10/1994 | Harrington | 345/420 |
| 5,363,476 | 11/1994 | Kurashige et al. | 345/425 |
| 5,369,735 | 11/1994 | Thier et al. | 345/423 |

OTHER PUBLICATIONS

Foley et al., Computer Graphics: Principles & Practice, pp. 260–271, 294–303, 1990.

*Primary Examiner*—Anton Fetting
*Attorney, Agent, or Firm*—Thorpe, North & Western, LLP

[57] ABSTRACT

Images for non-planar display systems are generated using polygon definitions that are pre-distorted using panel shear transforms. Initially, panel shear transforms are generated based on the configuration and orientation of a screen, a projector and a viewer. Polygons defined in model space are mapped to a two-dimensional space and then transformed to a panel space using the panel shear transforms. This transformation technique enables the use of standard two-dimensional rendering processes to scan-convert the polygons.

18 Claims, 9 Drawing Sheets

IMAGE MAPPING SYSTEM AND PROCESS USING PANEL SHEAR TRANSFORMS

FIELD OF THE INVENTION

The present invention relates to computer graphics systems and more specifically to non-linear image mapping for graphics systems with curved display screens.

BACKGROUND AND SUMMARY OF THE INVENTION

A wide variety of computer graphics systems display graphic images on curved display screens. For example, many flight simulators use projection systems incorporating a dome-shaped display screen. Typically, by using a dome-shaped screen (rather than a flat screen), the simulator can display an image that more realistically represents the actual view from a cockpit. In particular, as the simulator pilot moves his or her head, images can be displayed that encompass a full field-of-view.

Dome projection systems often use a pixel-based projector to generate the images displayed on the dome screen. That is, typically pixel-based projectors generate images using an array of individual picture elements ("pixels"). A typical display might be composed of a 1000-by-1000 array of pixels. To accomplish an image or picture, each of the pixels is defined in terms of color, intensity and other characteristics. An explanation of images composed of individual pixels is provided in a book Computer Graphics: Principles and Practice, 2nd Edition, Foley, van Dam, Feiner & Hughes, (Reprinted in 1991)(1990), by Addison-Wesley Publishing Company, see the section beginning on page 9.

In practice, dome projection systems often display images using different degrees of image resolution for different areas on the screen. For example, a dome projection system could have a 150 degree field-of-view background channel that is defined using one million pixels. A portion of the background channel would, in turn, be overlaid at an area of interest by a 40 degree high resolution inset that is defined by another one million pixels.

Considerable efficiencies in image processing can be achieved using multiple degrees of image resolution. For example, one multiple resolution technique involves displaying high resolution images only in the pilot's direct field-of-view rather than over the entire screen. This technique can be used because a pilot tends to focus on the portion of the screen (area of interest) directly facing his or her line of sight. As a result, less detailed imagery can effectively be used in the periphery of the pilot's field-of-view. The use of multiple degrees of resolution is well known and widely employed in the computer graphics art. Related structures are described in U.S. Pat. No. 4,348,186 (Pilot Helmet Mounted CIG Display with Eye Coupled Area of Interest, Harvey, et al.).

Projection systems that use multiple degrees of resolution often incorporate a head tracking system so that the high resolution image is always projected on the portion of the screen faced by the pilot. A typical tracking system uses a tracking helmet worn by the pilot capable of providing signals to a motor-controlled projector. As the pilot turns his or her head, the projector automatically slews to point in the general direction of the pilot's gaze. Thus, the area of interest is coordinated to the pilot's current view. Tracking helmets and motor-controlled projectors are well known and widely employed in the computer graphics art. For example, tracking helmets are described in U.S. Pat. Nos. 4,303,394 (Computer Generated Image Simulator, Berke, et al.) and 4,446,480 (Head Position and Orientation Sensor, Breglia, et al.).

Planar images displayed by dome projection systems as described above may be quite distorted if sufficient compensation is not provided. In practice, to provide adequate clearance for the projected imagery, the projector may be mounted above and behind the pilot's head. As a result, the angle through which an image travels from the projector to the pilot varies depending on which direction the pilot is facing. As this angle changes, distortion can be induced in the displayed image by these angular variations and the shape of the dome screen. As a result, the imagery computed for display in such a system typically is pre-distorted to compensate for this distortion.

Conventional simulation image generators have used a technique known as P-vector span processing to generate pre-distorted images. The P-vector approach defines the display geometry in terms of a spray of vectors ("P-vectors") emanating from the simulated eye position. The P-vectors map the display grid into contiguous volumes of space. Typically, a display of one million pixels would be divided into a thousand grid regions, each of 32-by-32 pixels. Each of these grid regions are defined in three-dimensional space by P-vectors from the simulated eye-point through the four corners of the grid. All image computation within the region, including the distortion compensation, is controlled by the P-vectors. Conventionally, scene details are defined as a collection of primitives such as polygons. Pixel information representative of the scene details is generated by rendering the polygons. When the P-vector technique is used, the polygons typically are rendered into pixels using three-dimensional arithmetic. Thus, the pixel data that defines the visual characteristics of the displayed pixels typically is computed using three-dimensional arithmetic.

The three-dimensional arithmetic operations used in the P-vector technique require a relatively large amount of processing. As a result, system performance (e.g., image update time) or image quality (e.g., resolution) often must be compromised when generating simulated images. Thus, to more effectively display images in real-time, faster processing hardware or less detailed images often must be used. Consequently, a need exists for a graphics system that generates pre-distorted pixel data more efficiently.

The present invention generates pre-distorted pixel data by mapping the scene details (e.g., polygons) into a two-dimensional space and distorting the scene details using transforms, called panel shear transforms, that account for the dome and angular distortion. By first mapping the scene details to two-dimensional space, the scene details can be pre-distorted and solved using two-dimensional arithmetic operations. This approach involves fewer processing operations than the three-dimensional arithmetic operations used in the P-vector technique. As a result, a system constructed according to the present invention may generate pre-distorted pixel data more efficiently.

According to an embodiment of the present invention, the panel shear transforms that account for the dome and angular distortions represent a mapping from the projector to the dome screen and from the dome screen to a two-dimensional space (called a tan-theta plane). The mapping from the projector to the dome screen involves mapping the projector's pixels to the tan-theta plane. The projector's pixels define a two-dimensional array, called a projector image plane, which can be represented graphically as a grid of squares bounded by the limits of the projector's field of projection. To reduce the number of mapping operations required, the projector image plane is subdivided into a number of square panels. For example, a typical panel would consist of a 16-by-16 array of pixels. These panels are mapped to the dome screen by locating where the corners of each panel project onto the surface of the dome.

After the panels are mapped to the dome screen, they are mapped to the tan-theta plane. The tan-theta plane is defined within the pilot's gaze and encompasses his or her entire field-of-view. The mapping process involves locating where the panel's corners mapped onto the dome screen project onto the tan-theta plane based on the pilot's line-of-sight to each corner.

Due to the curvature of the dome screen, the panels are generally "warped" when they are mapped to the tan-theta plane. As a result, the panel corners mapped to the tan-theta plane define a quadrilateral that is neither a square, a rectangle or a parallelogram. Consequently, the equations that describe these quadrilaterals would normally be relatively complex. Therefore, to improve the efficiency of the pre-distortion process, the quadrilaterals are replaced with parallelograms which can be described with relatively simple linear equations.

The panel shear transforms that are used to pre-distort the scene details are based on the equations that describe these parallelograms. Since these equations represent panel warping caused by the path from the tan-theta plane to the dome screen and to the projector, the equations effectively include the distortions introduced by the dome screen and the angular variations. Therefore, when scene details are transformed using the panel shear transforms, the scene details are properly pre-distorted.

As in conventional computer graphics systems, scene details displayed on the dome screen are generated from polygons defined in a three-dimensional model space. As discussed above, these polygons are mapped to the tan-theta plane before they are transformed using the panel shear transforms. Once the polygons are mapped to the tan-theta plane, the process determines the panels in the tan-theta plane to which each polygon maps. The polygons are transformed using the panel shear transforms for these panels. This transformation redefines the polygons in a panel coordinate space, which, in effect, maps the polygons back to the projector image plane.

After the polygons are transformed to panel coordinate space, they are processed using conventional two-dimensional flat screen rendering techniques. Thus, the polygons are scan converted to generate pixel data that numerically represents the visual characteristics of the pixels displayed by the projector. This pixel data will be appropriately pre-distorted as a result of the above transformation.

Accordingly, in a system of the present invention, pre-distorted pixel data is generated using two-dimensional mathematical operations. As a result, a system implementing the present invention may generate pixel data for curved screens more efficiently than systems that use three-dimensional methods such as the P-vector technique. In particular, the data for a given image can be processed faster thereby decreasing the amount of time it takes to update images on the screen. In addition, higher resolution images can be accommodated without the need for higher speed processors. Alternatively, slower, less expensive processors can be used to display images that are comparable to images generated by faster processors using three-dimensional techniques.

BRIEF DESCRIPTION OF THE DRAWINGS

In the drawings which constitute a part of this specification, an exemplary embodiment exhibiting various objectives and features hereof is set forth, specifically.

DESCRIPTION OF THE PREFERRED EMBODIMENT

As required, a detailed illustrative embodiment of the present invention is disclosed herein. However, computer graphics systems, projection systems, transform techniques and mapping techniques as well as other elements utilized in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
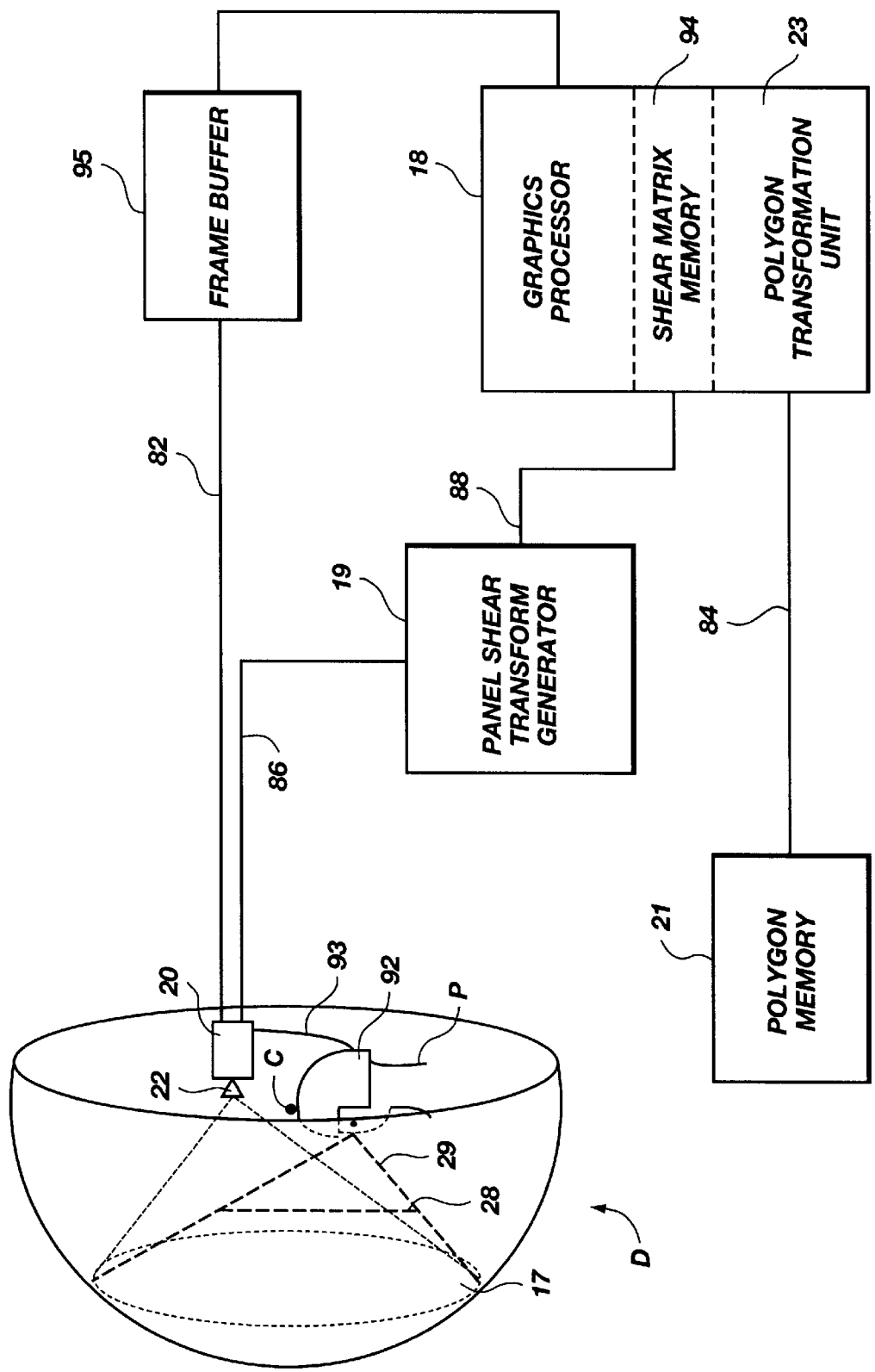
FIG. 1 is a block and pictorial diagram illustrating one embodiment of a dome projection system constructed according to the present invention.

Referring initially to FIG. 1, one embodiment of a dome projection system S constructed according to the present invention is shown. Essentially, a pilot P (upper left) who may be seated in a simulator (not shown) views a dynamic computer-generated display on dome D. That is, the interior of the dome D constitutes a viewing screen 17 upon which images from projector 20 are displayed. As discussed in detail below, using computer graphics techniques, images displayed on the screen 17 are generated from polygons that are pre-distorted using two-dimensional transforms. In that regard, the polygons stored to create the displayed images are processed to compensate for the distortion of the dome and the effects of the offset projector and pilot positions. In the case of the offset projector and pilot positions, this processing will take into account the position of the pilot relative to the projector as well as the orientation of the pilot's head. Thus, the present system is based on recognizing two-dimensional transforms that correct the above distortions and applying the transforms to display data in the course of mapping the display data for dissection into pixels as by scan conversion. These pixels are displayed by the projector 20 onto the screen 17 forming images that appear relatively undistorted to the pilot P.

In the embodiment of FIG. 1, a panel shear transform generator 19 generates two-dimensional panel shear transforms ("shear transforms") that account for the image distortions caused by the screen and the offset projector and pilot positions. Polygon definitions stored in a polygon memory 21 are pre-distorted by a polygon transformation unit 23 that maps the polygons to a two-dimensional space, called a tan-theta plane 28, and transforms them to a panel coordinate space ("panel space") using the shear transforms. The panel space polygon definitions are scan converted by a graphics processor 18 to generate pixel data that is sent to a projector 20. The projector 20 uses the pixel data to generate images on the screen 17.

To further an understanding of the present invention and before treating the system of FIG. 1 in greater detail, the geometric relationships of data processed in the disclosed embodiment will be addressed. These relationships involve a mapping between the projection generated by the projector 20 and the image seen by the pilot P. The projection generated by the projector 20 is defined by a projector image plane. Square panels defined in the projector image plane are projected to the dome screen and then to a tan-theta plane defined in the pilot's field-of-view. Since this mapping includes the path from the projector to the screen and from the screen to the pilot, the mapping accounts for the distortions that result from the screen and the offset between the projector and the pilot.

Shear transforms based on this mapping are used to pre-distort polygons that define the images seen by the pilot P. According to well-known graphics techniques, the polygons that define the displayed images are defined in a three-dimensional model space. These polygons are mapped to the tan-theta plane and, using the shear transforms discussed above, are mapped to panel space. This mapping, in effect, maps the polygons to the projector image plane. A detailed discussion of these geometric relationships follows.

According to well known techniques, the image generated by the projector 20 is comprised of a two-dimensional array of pixels (not shown). This pixel array defines a projector image plane which can be represented graphically as a regular square grid bounded by the limits of the projector's field-of-projection.

Figure 2:
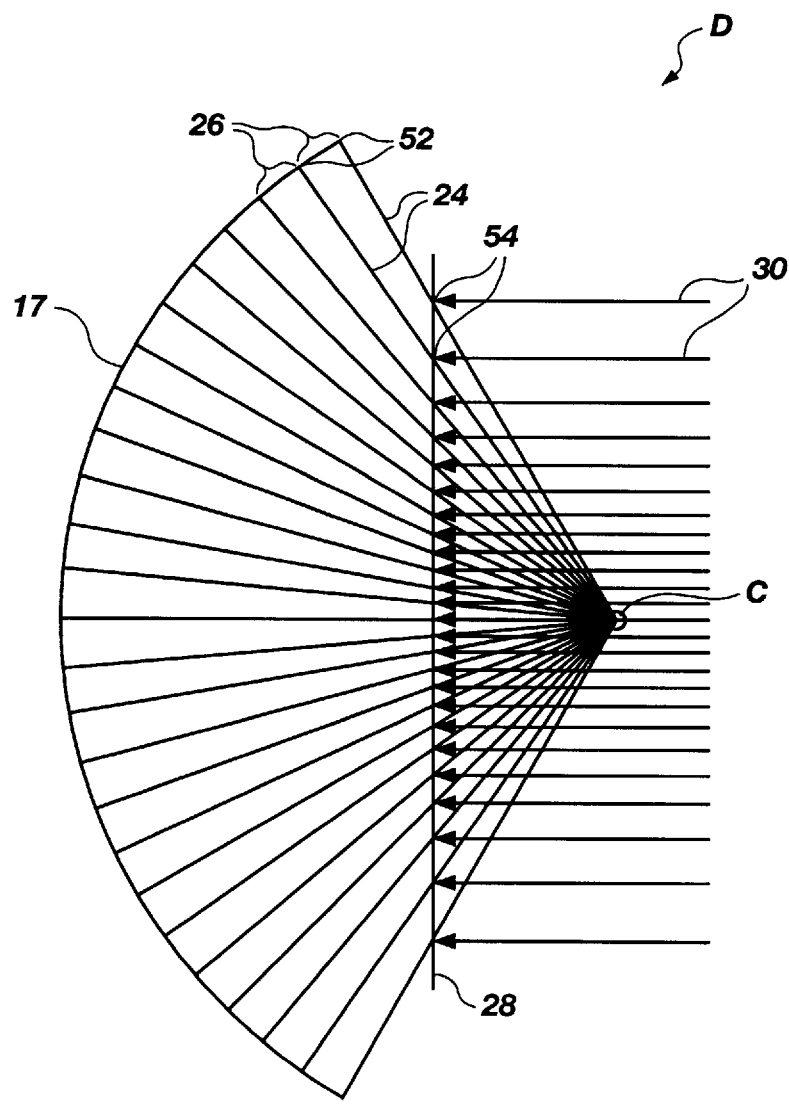
FIG. 2 is a graphic representation illustrating geometric relationships of a display scan line in a simplified embodiment of the present invention.

The pixels in the projector image plane are projected onto the display screen 17 according to the geometry of the projector lens 22 (FIG. 1). In the disclosed embodiment, the projector lens 22 is constructed so that pixel projections from the projector image plane are bent into an equal-angle distribution. FIG. 2 illustrates this equal-angle distribution for a single scan line (i.e., a single row of pixels in the pixel array). To simplify the figure, it is not to scale, it is idealized and both the projector and the pilot's eye are located at the center C (also see FIG. 1) of the display dome D. In practice, however, both the projector and the pilot's viewpoint normally would be positioned somewhere other than the center of the dome. FIG. 1 shows a more conventional, actual configuration where the projector 20 and the pilot P are offset from each other and the dome center C.

In FIG. 2, the projector located at the dome center C projects pixels to the screen 17 using an equal-angle distribution as represented by the lines 24. This distribution generates pixels on the screen 17 that have approximately the same pixel width 26. As a result, the pixels seen by the pilot on the display screen are generally square and are approximately the same size.

When the pixels are mapped from the display screen to the tan-theta plane, the shape of each pixel is changed due to the curvature of the screen. FIG. 2 illustrates this relationship for a single scan line. The tan-theta plane 28 is defined in the pilot's field-of-view 29 (FIG. 1) between the screen 17 and the pilot's viewpoint. Pixels are mapped from the screen 17 to the tan-theta plane 28 along the pilot's lines-of-sight (again represented by the lines 24 in this simplified example). The varying distances between the arrows 30 illustrate that the mapping from the screen 17 to the tan-theta plane 28 is non-uniform. Specifically, pixels in the middle of the screen 17 map to smaller areas on the tan theta plane 28 than pixels at the edge of the screen.

Figure 3:
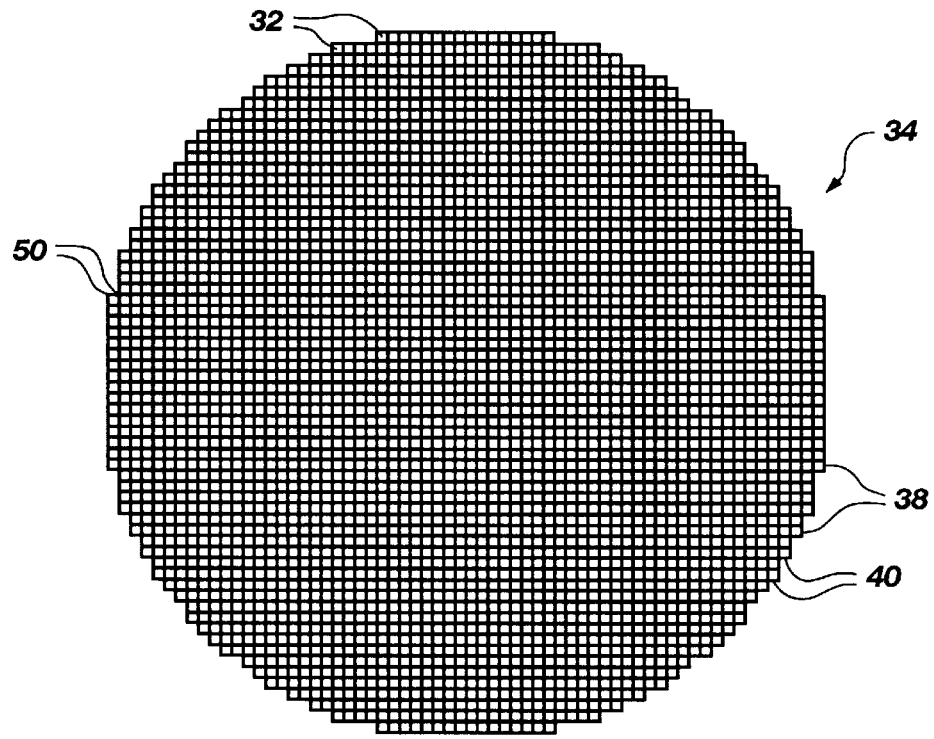
FIG. 3 is a graphic representation of one embodiment of a projector image plane as treated herein.
Figure 4:
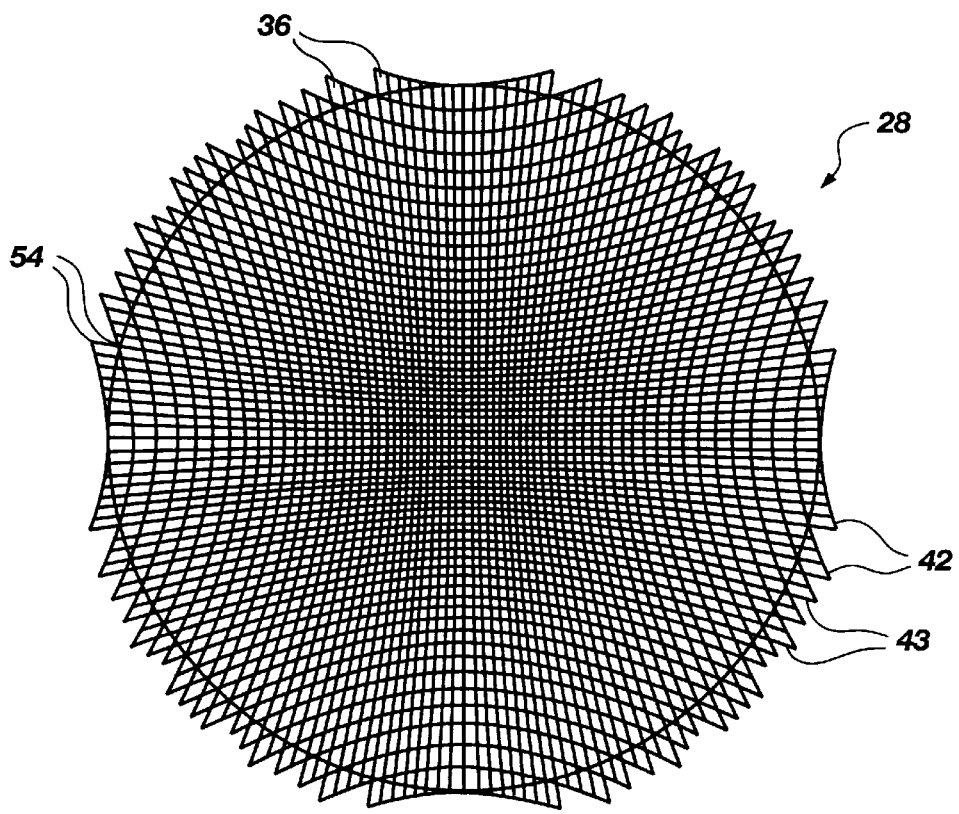
FIG. 4 is a graphic representation of one embodiment of a tan-theta plane as treated herein.

The effect this non-uniform pixel mapping has on panels that are mapped to the tan-theta plane is illustrated in FIGS. 3 and 4. FIG. 3 depicts a projector image plane 34 which has been sub-divided into an array of square panels (e.g., panels 32). In a typical embodiment, each panel 32 encompasses a 16-by-16 array of pixels. Since the panels 32 in the projector image plane 34 are square, they will be projected as squares on the display screen in the same manner that the pixels are projected as squares on the screen as discussed above.

FIG. 4 illustrates how the square panels 32 of FIG. 3 map to warped panels (e.g., panels 36) in the tan-theta plane 28. Because the non-uniform spacing of the projector image plane square panels 32 is occurring in both directions at once, the rows 38 and columns 40 of panels in FIG. 3 map to curved rows 42 and columns 43 of warped panels in the tan-theta plane 28.

The extent of the warping depends on the size of the dome's field-of-view. As FIG. 4 shows for a projection system that uses a dome with a 120 degree field-of-view, the warping of the square panels increases rapidly towards the edges of the field-of-view. To account for the distortion associated with a larger field-of-view, the scene can be clipped into four quadrants, each with its own tan-theta space. This technique reduces distortion enough to use the process described herein with domes having a field-of-view up to and beyond 180 degrees.

Figure 5:
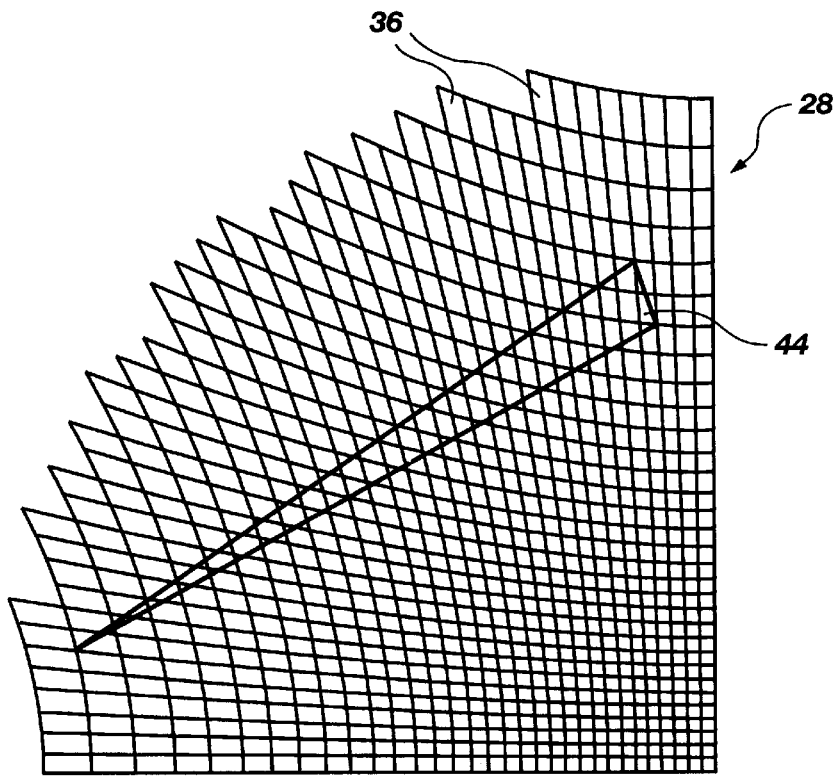
FIG. 5 is a graphic representation of a polygon mapped to a tan-theta plane as treated herein.
Figure 6:
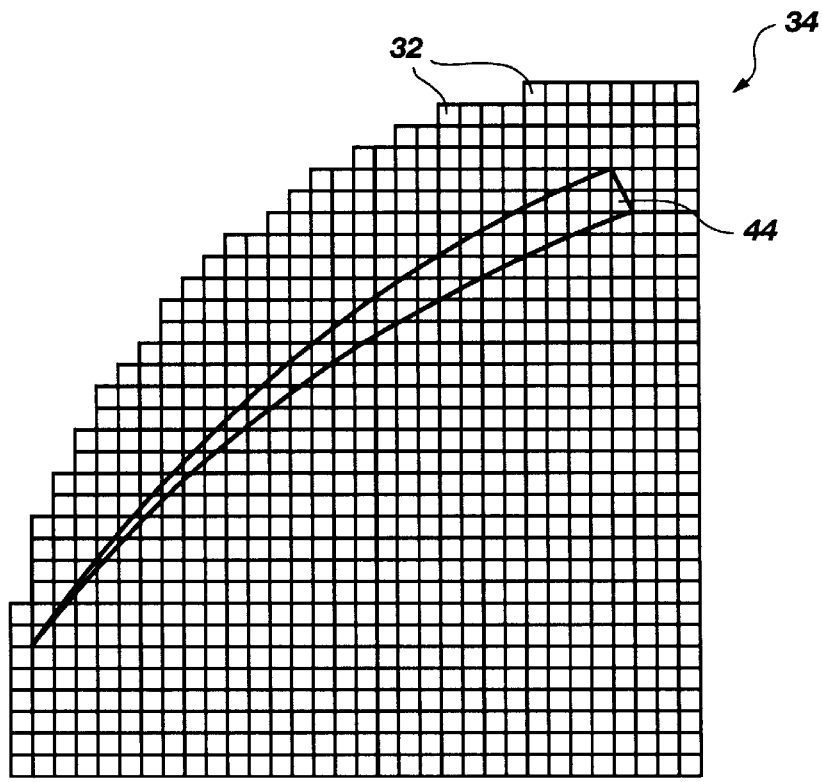
FIG. 6 is a graphic representation of a polygon mapped to a panel coordinate space as treated herein.

Referring now to FIGS. 5 and 6, the effect the non-linear mapping between the tan-theta plane and the projector image plane has on polygons defined in the tan-theta plane is illustrated. As discussed in detail below, images seen by the pilot are generated using polygons defined in a three-dimensional model space (not shown). The pilot's "view" of this three-dimensional space (typically referred to as the pilot's perspective space) can be represented by mapping polygons defined in the three-dimensional space to the tan-theta plane.

Since straight edges in the model space map to straight edges in perspective space, straight lines in model space map to straight lines in the tan-theta plane. FIG. 5 illustrates how a polygon defined in model space could map to a polygon 44 with straight edges in the upper-left quadrant of the tan-theta plane 28 of FIG. 4.

FIG. 6 illustrates how the mapping of the polygon 44 from the tan-theta plane to panel space may affect the shape of the polygon. When a polygon is mapped to panel space, the reverse of the above mapping is performed. Thus, the warped panels associated with the polygon (e.g., panels 36 in FIG. 4) map to square panels (e.g., panels 32 of FIG. 3). This warps the polygon 44 into a new shape such as the one depicted in FIG. 6. This warping includes all of the polygon's visual characteristics such as texture. In sum, for the pilot to see a polygon 44 that looks like the one in FIG. 5, the projector projects a "polygon" as depicted in FIG. 6.

Pre-distorted polygons are generated in the present invention as follows. As discussed above, the projector image plane is divided into a number of panels. Then, for each unique orientation of the pilot's gaze and the projector's aim, shear transforms are generated that represent how the panels are distorted when they are mapped to the tan-theta plane. Finally, the polygons defined in model space are distorted using the shear transforms. These latter two operations will now be discussed in detail.

Referring initially to FIGS. 1, 2 and 3, the process of generating the shear transforms will be treated. The corners 50 (FIG. 3) of each panel are mapped (as represented by lines 24 in FIG. 2) to points 52 (FIG. 2) on the screen 17 according to the construction of the projector lens 22 (FIG. 1) and the orientation of the projector 20 (FIG. 1). The points 52 (FIG. 2) on the screen 17 are mapped to points 54 in the tan-theta plane 28 along lines-of-sight (e.g., lines 24) to the pilot's eye-point (defined at the dome center C). Each set of points 54 associated with a given panel's corners define a quadrilateral in the tan-theta plane 28.

The above mapping is accomplished using geometric equations that describe the physical relationships of the dome components such as the dome shape and the orientations of the projector and the pilot. These transformations are easily defined and well behaved and can be accounted for using modest arithmetic. Transformations are well-known in the art of computer graphics. Examples of transforms are found in the above referenced book *Computer Graphics: Principles and Practice*.

In general, the quadrilaterals defined by the mapped panel corners in the tan-theta plane are not squares, rectangles or parallelograms. The irregular shape of the quadrilaterals is more clearly illustrated in FIG. 7 which depicts several exemplary quadrilaterals 56 in the tan-theta plane. Due to the irregular shape of the quadrilaterals, the mathematical equations that describe the quadrilaterals are relatively complex.

Figure 7:
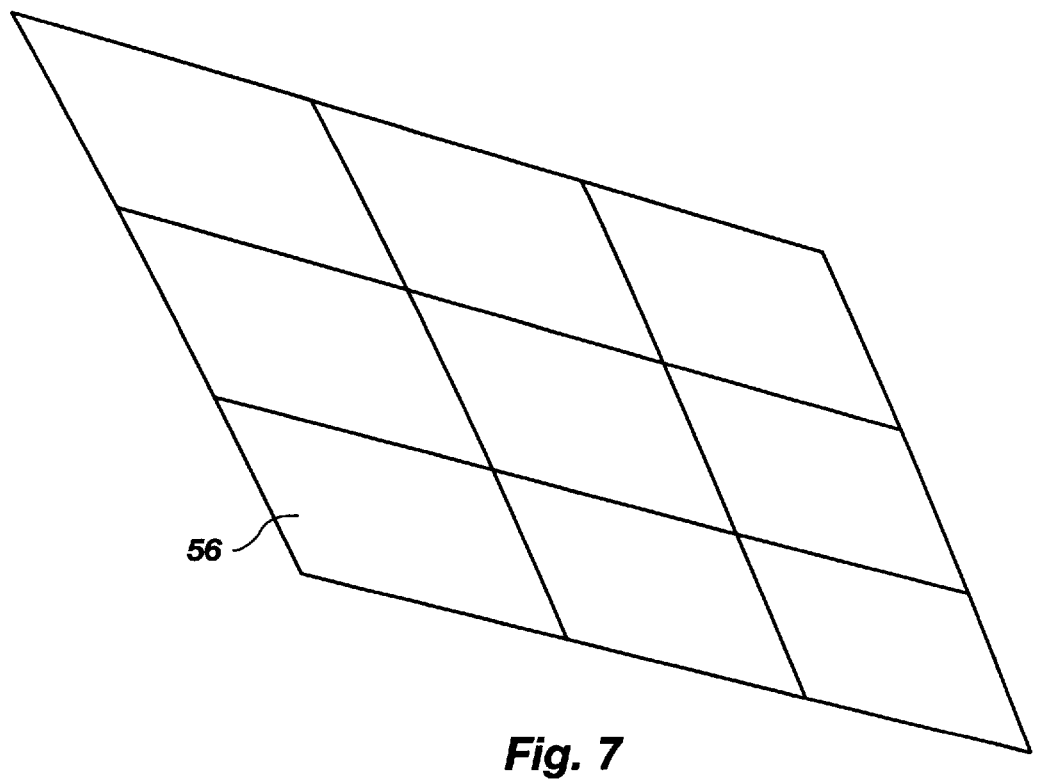
FIG. 7 is a graphic representation of quadrilateral panels in a tan-theta plane as treated herein.

However, as FIG. 7 illustrates, these quadrilaterals closely approximate parallelograms. Thus, since parallelograms can be described by relatively simple equations, each quadrilateral in the tan-theta plane is substituted with a parallelogram that occupies about the same space and almost shares edges with neighboring parallelograms. An example of this substitution is depicted in FIG. 8 which shows the quadrilaterals 56 of FIG. 7 replaced with parallelograms 58.

Figure 8:
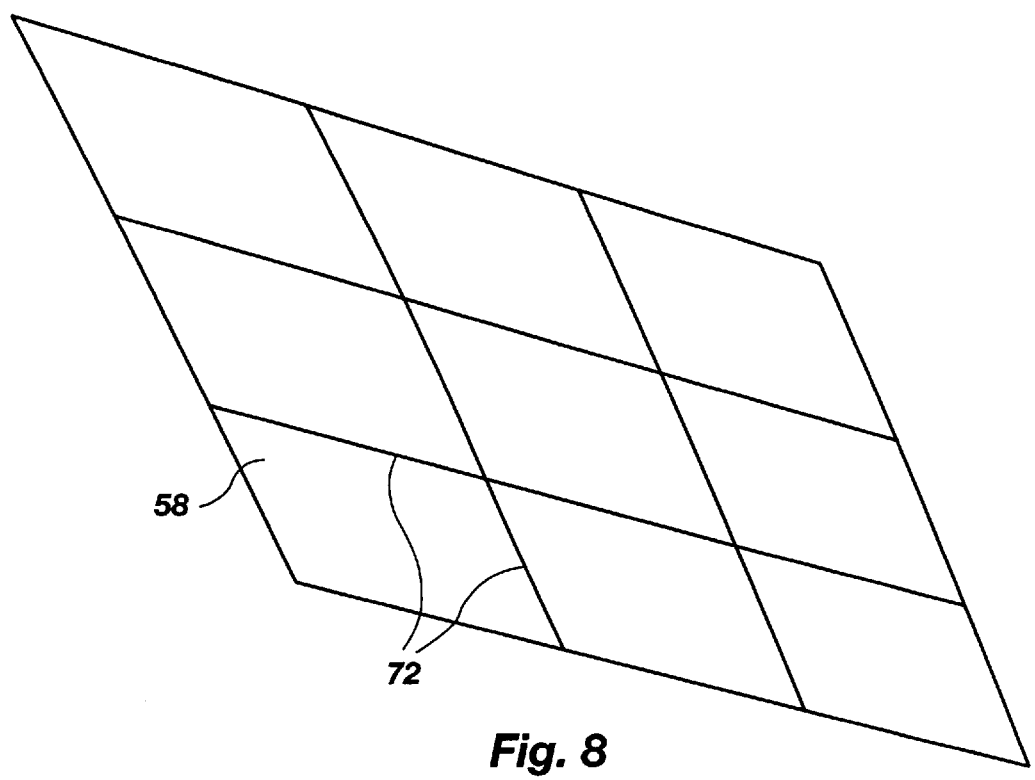
FIG. 8 is a graphic representation of the quadrilateral panels of FIG. 7 replaced with parallelograms.

As FIG. 8 illustrates, when parallelograms are substituted for the four-sided shapes, there are mismatches in the shared boundaries 72 between adjacent panels. These mismatches manifest themselves in the displayed image as "jogs" in scene edges that cross panel boundaries. However, if a sufficient number of panels are defined in the projector image plane, the mismatches become unnoticeable in the displayed image.

Figure 9:
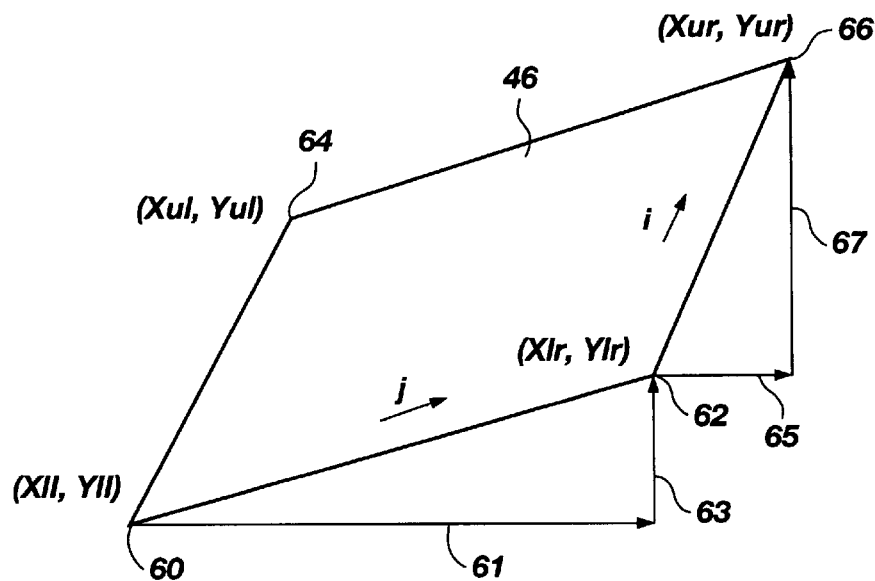
FIG. 9 is a graphic representation of the geometry of a panel in tan-theta space as treated herein.

Referring now to FIG. 9, the shear transforms will be discussed in detail. FIG. 9 depicts a panel 46 that has been transformed into tan-theta space. The coordinates of the panel's corners in tan-theta space can be calculated using the physical relationships of the dome components as discussed above. The panel is defined by X(ll, lr, ul, ur) and Y(ll, lr, ul, ur), the "X" and "Y" tan-theta coordinates of the panel's lower left 60, lower right 62, upper left 64 and upper right 66 corners, respectively. In addition, j represents the pixel coordinate along a scan line and i represents the scan line coordinate. A step in either the i or the j direction involves a change of both X and Y. In particular, a step in the j direction involves a change of Xlr−Xll at the bottom of the panel and a change of Xur−Xul at the top. If the quadrilateral panel 46 is transformed into a parallelogram by averaging its corner values, the change in X for a step in j is (Ylr+Yur−Yll−Yul)÷2, etc. Accordingly, four values can be computed that define the panel parallelogram in terms of its tan-theta deltas:

$$DXj=(Xlr+Xur-Xll-Xul)\div2 \qquad \text{EQUATION 1}$$

$$DYj=(Ylr+Yur-Yll-Yul)\div2 \qquad \text{EQUATION 2}$$

$$DXi=(Xul+Xur-Xll-Xlr)\div2 \qquad \text{EQUATION 3}$$

$$DYi=(Yul+Yur-Yll-Ylr)\div2 \qquad \text{EQUATION 4}$$

Where DXj is delta-X for a step in j (arrow 61, FIG. 9), DYj is delta-Y for a step in j (arrow 63), DXi is delta-X for a step in i (arrow 65) and DYi is delta-Y for a step in i (arrow 67). These four values define a 2-by-2 transformation matrix that converts the unit vectors i and j (i=(0,1) and j=(1,0)) into the panel parallelogram:

$$\begin{vmatrix} x' \\ y' \end{vmatrix} = \begin{vmatrix} DXj & DXi \\ DYj & DYi \end{vmatrix} * \begin{vmatrix} x \\ y \end{vmatrix} \qquad \text{EQUATION 5}$$

When transforming the polygons defined in model space to panel space, the polygons are scanned along pixel rows in j and pixel columns in i. The goal is to generate a shear transform that transforms the parallelogram in the tan-theta plane to a square in panel space. This will make the i and j coordinate axes perpendicular and of equal length. This same transformation is then applied to the polygons, distorting them into some other shape. The transformation that accomplishes this is the inverse of the above 2-by-2 matrix. An inverse matrix is calculated using Cramer's Rule:

$$\begin{vmatrix} a & b \\ c & d \end{vmatrix}^{-1} = \frac{1}{ad-bc} \begin{vmatrix} a & -b \\ -c & d \end{vmatrix} \qquad \text{EQUATION 6}$$

The normalizing factor is thus 1÷(DXj*DYi−DXi*DYi), and is applied to the four matrix components. This scales the panel so it is one unit large in both directions. All prior scaling of the tan-theta values is arbitrary and is corrected at this step. The DXj, etc., values are multiplied by the panel size in pixels so that the final transformation will express the polygon in pixel units in the panel shear space. In the equations that follow, the nomenclature DXj', etc., will be used for the normalized, pixel scaled components.

Figure 10:
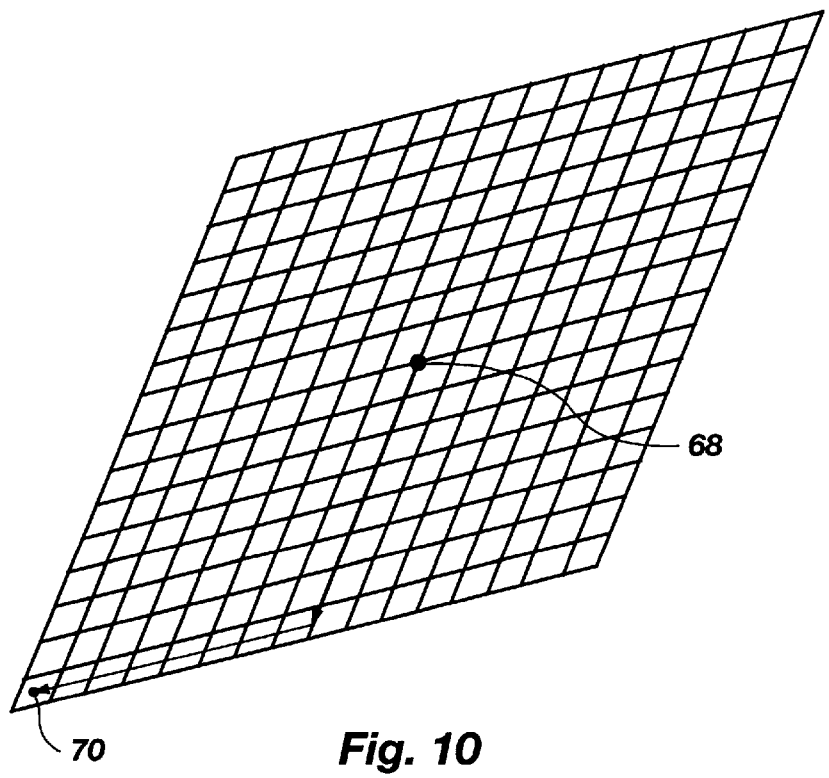
FIG. 10 is a graphic representation illustrating panel scaling and offset geometry as treated herein.

At this point, it may be useful to compute a panel offset that can be subtracted from the tan-theta values so that the resulting vertex pixel values are relative to the panel origin. FIG. 10 illustrates the scaling and offset geometrically.

The panel center 68 X and Y coordinates are:

$$PCX=(Xll+Xlr+Xul+Xur)\div4 \qquad \text{EQUATION 7}$$

$$PCY=(Yll+Ylr+Yul+Yur)\div4 \qquad \text{EQUATION 8}$$

The panel origin 70 (located at the center of the lower left pixel) X and Y coordinates are:

$$POX=PCX+\text{offset}*(DXj+DXi) \qquad \text{EQUATION 9}$$

$$POY=PCY+\text{offset}*(DYj+DYi) \qquad \text{EQUATION 10}$$

Here, assuming the panel size ("PS") is 16 pixels, the panel offset fraction ("offset") would be:

$$\frac{\frac{-PS}{2}+0.5}{PS} = \frac{-7.5}{16} = -0.46875 \qquad \text{EQUATION 11}$$

In sum, the use of shear transforms allows scene details within each panel to be solved using relatively simple arithmetic. As described above, relatively simple arithmetic operation are performed on the panel coordinates to construct a 2-by-2 shear matrix for each panel. This matrix can then be applied to the polygon tan-theta coordinates to transform the polygon coordinates into panel space. Moreover, because each panel is solved with polygons that are transformed to the panel's unique panel space, cracks or holes do not open up in the imagery. Thus, within a given panel, all scene details are treated consistently.

In the disclosed embodiment, the front-end of the graphics pipeline, typically implemented with a graphics processor or with a Real Time System ("RTS") that runs on a general purpose computer, would be used to compute the shear transforms. Thus, the panel shear transform generator 19 (FIG. 1) would be implemented in this part of the pipeline. After the shear transforms are generated, the panel shear transform generator 19 sends the shear transform representations over the line 88 to the shear matrix memory 94 in the graphics processor 18.

In practice, the nature and quantity of the scene distortion usually changes as the direction of the pilot's gaze changes. As a result, the shear matrices must be recomputed every time the pilot's gaze changes. This is accomplished, in part, using signals from the tracking helmet 92 (FIG. 1) and the motor controlled projector 20. As the pilot's head moves, the tracking helmet 92 sends signals through a cable 93 to the projector 20 indicating the orientation of the helmet and, in some embodiments, the orientation of the pilot's eyes is indicated. These signals are used by the projector to slew in the direction of the pilot's gaze. In addition, signals indicative of the orientation of the tracking helmet 92 and the projector 20 are sent over the line 86 to the panel shear transform generator 19 and used to generate the shear transforms. As discussed above, tracking helmets and motor-controlled projectors are well known in the art. Thus, the disclosed embodiment may be constructed using a wide variety of these components.

For each orientation of the pilot P (FIG. 1) and projector 20 with respect to the screen 17, the images displayed on the screen are generated from polygons that are distorted using the shear transforms that correspond to that orientation. This is accomplished in the disclosed embodiment as follows. First, polygons defined in three-dimensional model space are mapped to the tan-theta plane. Then, the tan-theta polygons are transformed to panel space using the appropriate shear transforms. In practice, a polygon may overlap several panels in the tan-theta plane. In this case, the polygon is transformed one panel at a time using the shear transforms associated with each panel. Finally, the panel space polygons are scan converted to generate the pixel data for the projector pixels.

As in conventional computer graphics systems, images to be displayed on the dome display screen are defined as a collection of graphic objects in a three-dimensional model space (not shown). In a dome projection system, this model space is typically represented by a three-dimensional conic space that has an apex at the pilot's eyes and is bounded by the outer edge of the dome. Thus, the images displayed on the screen represent the objects that a pilot would see in the three-dimensional space behind the screen.

The objects in model space are typically defined by subdividing the objects into polygons that are numerically represented in terms of size, color, location within the model space and other characteristics. The numerical representations of the polygons are stored in a polygon memory 21 (FIG. 1) and processed by the graphics processor 18 when the objects are to be displayed. The technique of generating graphical images using polygons is well known in the art of computer graphics.

Figure 11:
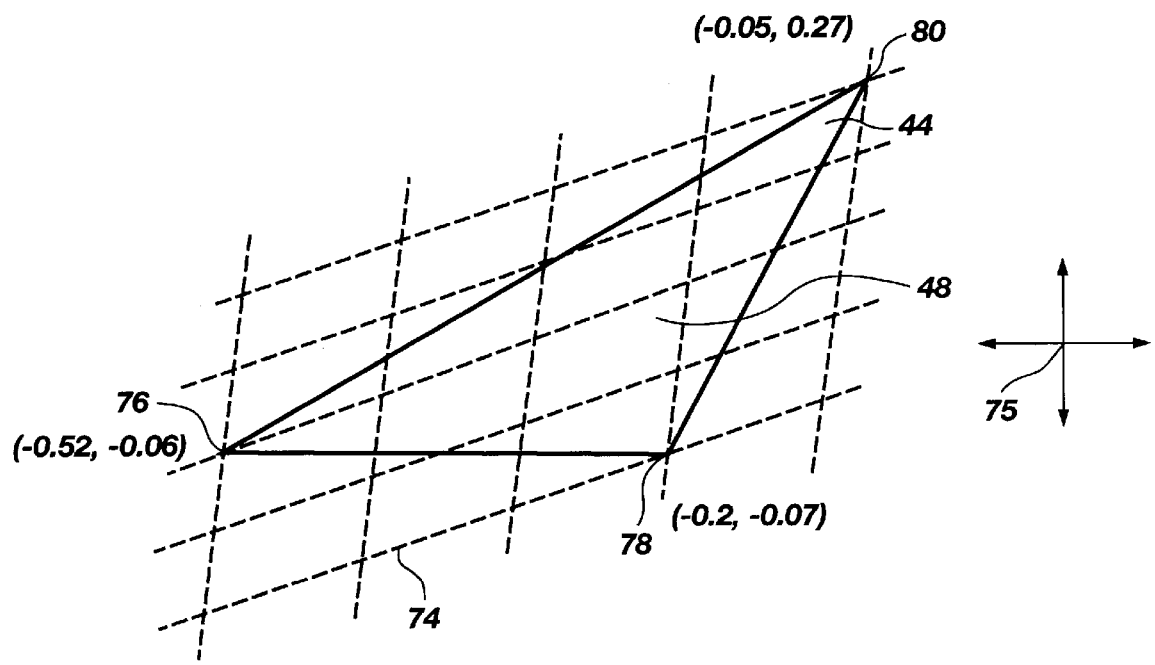
FIG. 11 is a graphic representation of polygon coordinates in the tan-theta plane as treated herein.

In the disclosed embodiment, a polygon transformation unit 23 (FIG. 1) maps the polygons from model space to a two-dimensional space. This two-dimensional space, called the tan-theta plane 28, represents the pilot's perspective of the three-dimensional model space. The tan-theta plane 28 is defined within the pilot's line of sight and encompasses the pilot's field-of-view of the model space. The technique of mapping polygons from a three-dimensional space to a two-dimensional space is well known and widely used in flat-screen display computer graphics systems. Basically, the polygons are clipped as necessary and mapped to the tan-theta plane by mapping the polygon vertices along the pilot's lines-of-sight and by blending or masking overlapping polygons. FIG. 11 depicts a polygon 44 mapped to the tan-theta plane and defined in tan-theta coordinates. Here, the origin of the tan-theta plane is defined by the cross-hairs 75. The dashed lines 74 in FIG. 11 represent a tessellation of the geometry of panel 48 as a visual aid.

After a polygon is mapped to the tan-theta plane, the process determines which panels bound the polygon. Here, the shear transforms are used to compute how the polygon gets "bent" by the non-linear image mapping. In general, non-linear image mapping bends edges. This creates two problems. First, the polygon may acquire one or more concavities. Second, the vertices are no longer sufficient to define a bounding region (box) for the polygon. To avoid the wasted effort of considering panels (and pixels) that are later found to lie outside the polygon and to avoid missing some that are inside the polygon, the rendering process must first trace its way around the polygon to determine which set of panels bound the polygon. This process is called "panel walking," and is typically done in the geometric processor section of the rendering pipe.

Due to the non-linear mapping of panels into tan-theta space, there is no defined inverse transform to convert tan-theta values into panel indices. The transform is changing all over the screen. As a result, the process must first select a panel and then apply the panel's transform to the polygon's vertices in order to determine where the vertices are relative to the panel.

In addition, the substitution of the panel quadrilaterals with parallelograms can cause problems that the searching and edge walking processes need to take into account. The panels defined by their respective transforms form a loose, irregular tiling of the image plane (see FIG. 8). Within this tiling, panel corners are not shared and do not generally coincide with their neighbors. In addition, there are sub-pixel overlaps and "underlaps" between all the panels. These issues must be accounted for so that the processes do not get caught in endless loops or fail to converge.

The first phase of panel walking is to find a starting panel-one that contains a vertex of the polygon. The process begins by starting at an arbitrary panel, typically near the "center" of the panel space. Next, the process transforms the selected start vertex into this panel space and checks the vertex's resultant coordinates to see if it lies inside the panel.

If the vertex does not lie within the panel, the transformed vertex coordinates are used to compute a "jump" distance from the current panel to one that is closer to the vertex. This jump distance is only approximate, since it is derived from the non-linear image mapping distortion at the present panel and can't account for the change of distortion between "here" and "there."

It is also possible that the start vertex lies in one of the "cracks" between panels and is found to be outside both of them. In this case, the search algorithm will terminate with the panel that is closest to the vertex.

Tests with historical worst-case non-linear image mapping distortions (including off-axis effects) have shown that the start panel search usually converges in about 3 iterations.

Once the start panel has been found, the panel's edges are walked. This process begins with the initialization of an auxiliary data structure. This data structure contains a table that records the farthest left and right panels hit in each row of panels and a table that records the top and bottom panels hit in each column of panels. These structures are fairly small. For example, a 1K×1K image with a panel size of 16 pixels only has 64 entries in each table. Each of these entries consist of a panel X and Y offset and four shear matrix coefficients.

After the data structure is initialized, each polygon edge is considered in turn. During the walking of an edge, its two endpoints are transformed into the panel space of the current panel. Edge slopes are computed, the edge is characterized as either a top, bottom, left or right edge, and the "panel extremes" tables are updated as appropriate.

A "next" panel is selected based on which panel boundary the edge exits. After the next panel is selected, the above process is repeated. Note that an edge exiting the left boundary of one panel may not necessarily enter on the right boundary of the next due to the loose fit of panels to each other.

After all the edges have been walked, the two tables recording the extreme values are processed to identify all the interior panels. Each row of panels is considered, and if there are any active panels in the row, then all the columns between the left and right extremes are considered. If the current row number lies between the column top and bottom extremes, the panel is interior to the polygon and must be processed. In sum, the above algorithm neatly accounts for concavities at the panel level.

After the process determines which panels bound the polygon, the polygon is sent to the rest of the render pipe. For each panel the polygon affects, the polygon is sheared into the local panel space using the shear transform for that panel. A given panel's shear transform redefines the polygon vertices in pixel units, relative to the panel. Importantly, within a given panel, the geometry and its associated arithmetic is linear. Polygon edges are straight and there are no concavity problems that need to be taken into account.

To transform a polygon vertex from quadrant tan-theta space to sheared-panel pixel space, the panel offset is subtracted from the vertex and this result is multiplied by the normalized inverse shear matrix:

$Xn = X\text{tantheta} - PCX$  EQUATION 12

$Yn = Y\text{tantheta} - PCY$  EQUATION 13

$X\text{pixel} = Xn*DYi' - Yn*DXi'$  EQUATION 14

$Y\text{pixel} = -Xn*DYj' + Yn*DXj'$  EQUATION 15

Figure 12:
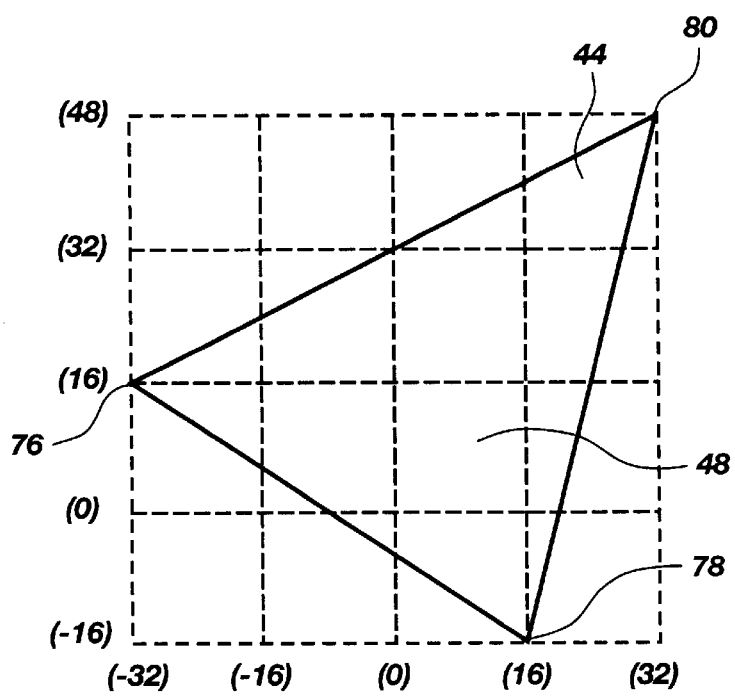
FIG. 12 is a graphic representation of polygon coordinates after a panel shear transform as treated herein.

In this space, pixels in the panel go from zero to fifteen in i and j, relative to the polygon vertex coordinates. FIG. 12 shows the polygon of FIG. 11 after the transformation. The polygon vertices 76, 78 and 80 are now defined in pixel units, relative to the panel 48. As FIG. 12 illustrates, the panel 48 from FIG. 11 effectively maps to a square after the transformation.

The above calculation must be done anew for every panel a polygon affects. However, only the two-dimensional vertex X and Y values must be recomputed. There are no changes needed in Z (depth) or in the shading and texture information. In addition, all subsequent interpolations of these quantities proceed correctly irrespective of the panel shear distortion. The sheared vertex values form the basis for barycentric interpolation within the panel and yield the same results independent of the nature of the shear.

In the disclosed embodiment, a graphics processor typically would be used to clip and map the polygons to tan-theta space, walk each polygon into a list of affected panels and transform the polygon tan-theta vertices into panel space vertices using the shear transforms. Thus, the polygon transformation unit 23 operations described above typically would be implemented by the graphics processor section of the graphics pipeline.

After shearing, all subsequent rendering continues as it would in a two-dimensional flat-screen case. The details of the polygon rendering process are well known in the art of computer graphics systems. For example, detailed operations and structures of polygon manipulation and display may be found in the book *Principles of Interactive Computer Graphics,* 2nd Edition, Newman and Sproull, McGraw-Hill Book Company, 1979.

Essentially, the graphics processor 18 (FIG. 1) processes each polygon to determine the influence each polygon has on the pixels in the display. This involves determining which pixels are influenced by a given polygon and determining the effect of the polygon in terms of characteristics such as color and transparency on those pixels. During a typical polygon rendering process, a polygon is effectively sampled at intervals across the face of the polygon with each sample location corresponding to one of the pixels on the display screen. This "sample" consists of data, called pixel data, that represents the characteristics of the polygon at that location.

As the pixel data is generated, it is typically stored in a frame buffer 95 (FIG. 1) from which it is sent to the projector 20 over the line 82. The projector 20 uses this pixel data to generate electrical signals that generate the illuminated pixels the pilot sees on the screen 17.

In view of the above description of the disclosed embodiment, it is apparent that the present invention provides an improved graphics display system. The present invention provides the necessary distortion capability within the framework of a two-dimension rendering engine at the cost of a modest amount of additional work in the programmable graphics processor front-end of the system.

The disclosed embodiment would generally be implemented using standard computer graphics system components and head-tracked dome projection equipment. Thus, the dome projection system could be constructed using a wide variety of screen, tracking helmet and motor-controlled projector components.

The graphics portion of the system typically would consist of some form of graphics pipeline. For example, the front-end of the system, typically implemented with an RTS or graphics processor, would be used to compute the shear transforms dynamically as the pilot's head moves. In addition, a graphics processor typically would be used to transform the polygons to panel space.

Depending on system requirements, the panel shear transform generator 19, polygon transformation unit 23 and rendering operations described above may be performed on the same processor or different processors. Typically, the above pipeline would be implemented using an image generator that consist of a central processor unit and graphics processor, the basic concepts of which are disclosed in the book *Fundamentals of Interactive Computer Graphics*, Foley and Van Dam, 1984, Addison-Wesley Publishing Company, at chapters 4 and 18. The details of polygon rendering and the corresponding structures used to implement these processes are also well known in the computer graphics art. Several of these techniques and structures are discussed at length in the books *Principles of Interactive Computer Graphics*, Newman and Sproull, referenced above, and *Computer Graphics: Principles and Practice*, 2nd Edition, Foley, van Dam, Feiner & Hughes, (Reprinted in 1991)(1990), by Addison-Wesley Publishing Company.

The polygon memory 21 (FIG. 1) and the memory associated with the processors typically would be implemented using a conventional RAM data memory. Nevertheless, these components may be implemented using any suitable data storage method. In addition, the polygon memory and shear matrix memory may be implemented using separate memory components, the same memory component or may be incorporated into the image generator or other processors depending on the selected system design.

In some embodiments, some of the above functions may be implemented using other functionally equivalent components including, but not limited to, microprocessors, custom microchips, discrete components and the like. Furthermore, significant portions of the above operations would typically be implemented using computer software programs. The details of these and related implementations are well known in the art of computer systems and computer graphics systems.

Finally, the lines in FIG. 1 (e.g., lines 84 and 88) generally represent the flow of data from one operation to another. Thus, these lines may be implemented using any number of data flow techniques including, but not limited to, data busses that connect the data ports of discrete components or busses that are located inside integrated components. In addition, in integrated computer graphics systems, the flow of data from one component block to another may be implemented using computer program parameter passing operations, inter-process communications or other software techniques.

Figure 13:
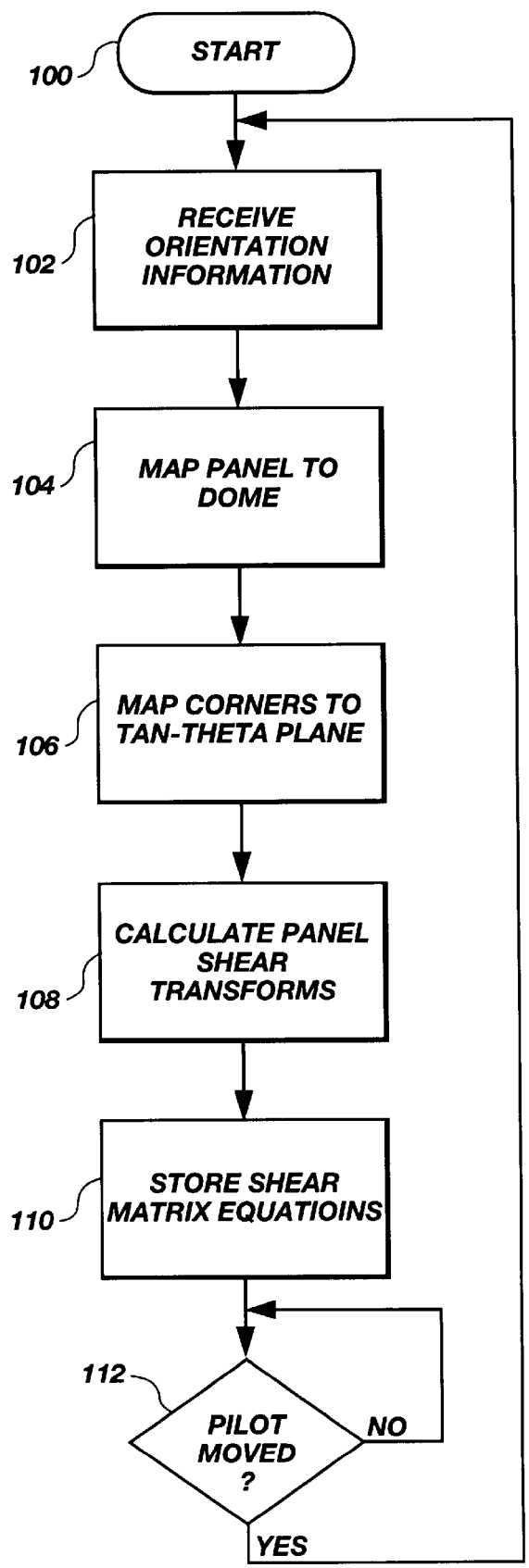
FIG. 13 is a graphical representation of one embodiment of a panel shear transform generation process according to the present invention.
Figure 14:
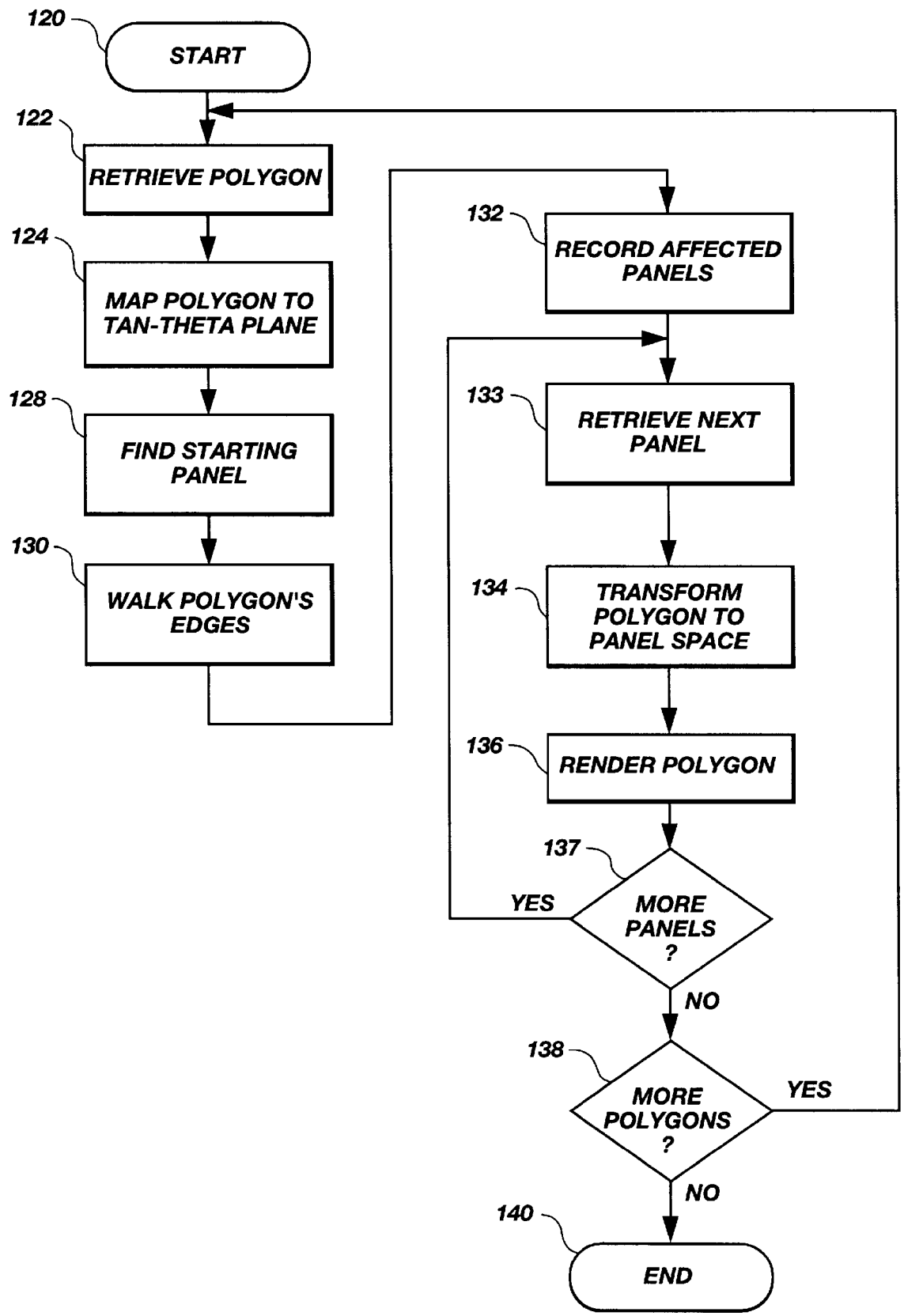
FIG. 14 is a graphical representation of one embodiment of a pixel data generation process according to the present invention.

With the structure and function of the components of the present invention in mind, the basic operation of exemplary non-linear image mapping processes performed by the embodiment of FIG. 1 is treated in FIGS. 13 and 14. FIG. 13 describes the shear transform generation process while FIG. 14 describes the process of generating pixel data using the shear transforms.

Referring to FIG. 13, the shear transform generation process is illustrated starting at a block 100 (top). As discussed above, the front end of the system computes the panel shear transforms dynamically as the pilot's head moves. As represented by a block 102, as the pilot P (FIG. 1) moves his or her head, the panel shear transform generator 19 receives signals representative of the current orientation of the tracking helmet 92 and the projector 20 over the line 86. At a block 104, the panel shear transform generator 19 maps the corners of the panels defined in the projector image plane to the screen 17 according to the orientation of the projector 20 relative to the screen. The panel shear transform generator 19 maps these corners to the tan-theta plane 28 according to the orientation of the tracking helmet 92 relative to the screen (block 106). At a block 108, the panel shear transform generator 19 calculates the shear transforms for every panel. As discussed above, this process includes generating the inverse shear matrix, scaling the panels and calculating the panel offsets. Finally, at a block 110, the panel shear transform generator 19 stores the transforms in the shear matrix memory 94 over the line 88. The process then proceeds to a block 112 and the above steps are repeated whenever the pilot moves his or her head. This process continues as long as the simulation is in progress.

Referring to FIG. 14, the pixel data generation process is illustrated starting at a block 120 (top). As new images are to be displayed on the screen, the graphics processor 18 (FIG. 1) retrieves polygon definitions from the polygon memory 21 over the line 84 (block 122). The polygon transformation unit 23 clips these polygons as necessary and transforms the polygon coordinates into tan-theta space (block 124). Most of the polygon data (e.g., color, texture and depth coordinates) only needs to be sent to the render pipe just this once.

Once the polygons are mapped to tan-theta space, the polygon transformation unit 23 performs the panel walking procedure to determine which panels are affected by the polygon. At a block 128, the polygon transformation unit 23 finds a starting panel. Then, at a block 130, the polygon transformation unit 23 walks the polygon's edges to find the "extreme" panels. Finally, the polygon transformation unit 23 determines which panels lie within the extreme panels and stores a list of affected panels (block 132).

At this point, the process enters a loop where the polygon is transformed to panel space and rendered, one panel at a time. At a block 133, the process retrieves one of the panels from the list stored at block 132. As represented by a block 134, the polygon transformation unit 23 multiplies the two-dimensional tan-theta polygon vertices by this panel's normalized inverse shear matrix to obtain the polygon's panel space vertices for this panel. The new panel vertex data is then sent to the rest of the render pipe.

As represented by a block 136, the graphics processor 18 generates pixel data using the transformed polygon definitions. Although this requires the render pipe to re-do the panel setup calculations for every panel, these computations are largely overlapped with processing on prior panels. As the pixel data is generated, it is stored in a frame buffer 95 from which it is sent to the projector 20 over the line 82 whereupon the projector displays the desired image on the screen 17.

At a block 137, the process determines whether there are any more affected panels in the list stored at block 132. If there are more affected panels, the process returns to block 133 where the next panel is retrieved. If not, the process proceeds to a block 138.

As represented by a block 138, the above process is repeated for each polygon that is to be displayed. If no more polygons are to be processed, the process terminates at a block 140.

From the above, it is apparent that the system disclosed herein utilizing shear transforms offers an improved system for generating pre-distorted pixel data. Recognizing that the system can be implemented with standard graphics and display components, it should be noted that considerable variation may occur in the specific components and operating format. The scope of the present invention should be determined with a reference to the claims set forth below.

What is claimed is:

1. A computer graphics system for providing picture element (pixel) signals to a display for displaying a plurality of objects defined as irregularly shaped quadrilaterals in a model space, said pixel signals being generated from said objects and a plurality of panel transforms, said panel transforms being representative of a mapping of a plurality of panels between an image space, a curved surface and a two-dimensional space, said system comprising:

an object memory for storing said objects;

a panel transform generator for generating said panel transforms representative of said mapping of said panels between said image space, said curved surface and said two-dimensional space by mapping geometric parameters of the panels in the image space to corresponding geometric parameters in the two-dimensional space and substituting parallelograms for the irregularly shaped quadrilaterals; and a graphics processor for processing said objects using said panel transforms to provide said pixel signals.

2. The computer graphics system of claim 1 wherein said panel transform generator maps a plurality of vertices of said panels to a plurality of vertices in said two-dimensional space.

3. The computer graphics system of claim 2 wherein said panel transform generator defines a plurality of parallelograms using said vertices in said two-dimensional space.

4. The computer graphics system of claim 1 wherein said panel transforms comprise two-by-two matrices defined by a formula:

$$DXj=(Xlr+Xur-Xll-Xul)\div 2$$

$$DYj=(Ylr+Yur-Yll-Yul)\div 2$$
$$DXi=(Xul+Xur-Xll-Xlr)\div 2$$
$$DYi=(Yul+Yur-Yll-Ylr)\div 2$$

Where DXj, DYj, DXi and DYi are elements of said two-by-two matrix and where Xll, Xlr, Xul and Xur and Yll, Ylr, Yul and Yur are X and Y coordinates of lower left, lower right, upper left and upper right corners, respectively, of a panel mapped to said two-dimensional space.

5. The computer graphics system of claim 1 further including a display device, coupled to receive said pixel signals, for displaying images on said curved surface.

6. The computer graphics system of claim 5 further including a tracking device and a positioning device wherein said positioning device moves said display device to point in a direction based on a view defined by said tracking device and wherein said panel transform generator generates said panel transforms based on said direction and said view.

7. The computer graphics system of claim 1 wherein said processing includes panel walking.

8. A dome projection system including a tan-theta plane, comprising:

a curved screen;

an object memory for storing an object representative of an image having irregularly shaped quadrilaterals in the tan-theta plane to be displayed on said curved screen;

a panel transform generator for generating a panel transform representative of a mapping from an image space to said screen and from said screen to a two-dimensional space, wherein said panel transforms are generated by mapping geometric parameters of the panels in the image space to corresponding geometric parameters in the two-dimensional space and substituting parallelograms for the irregularly shaped quadrilaterals;

a graphics processor for processing said object and said panel transform to provide picture element data for display; and a display device for displaying said picture element data on said screen.

9. The dome projection system of claim 8 further including a tracking device and a positioning device wherein said positioning device moves said display device to point in a direction based on a view defined by said tracking device and said panel transform generator generates said panel transform based on said direction and said view.

10. A computer graphics process for generating picture element data to display an image on a curved surface, comprising the steps of:

defining an object representative of an image having irregularly shaped quadrilateral panels on a tan-theta plane to be displayed on said curved surface;

defining a panel in an image space;

generating a panel transform representative of a mapping of said panel to a two-dimensional space wherein parallelograms are substituted for the irregularly shaped quadrilaterals; and generating picture element data using said object and said panel transform, wherein two-dimensional arithmetic operations are used to generate the picture element data.

11. The computer graphics process of claim 10 wherein said mapping includes the step of mapping a plurality vertices of said panel to a plurality of vertices in said two-dimensional space.

12. The computer graphics process of claim 11 wherein said generating a panel transform includes the step of defining a parallelogram using said vertices in said two-dimensional space.

13. The computer graphics process of claim 10 wherein said generating a panel transform includes the step of defining a two-by-two matrix using a formula:

$$DXj=(Xlr+Xur-Xll-Xul)\div 2$$

$$DYj=(Ylr+Yur-Yll-Yul)\div 2$$
$$DXi=(Xul+Xur-Xll-Xlr)\div 2$$
$$DYi=(Yul+Yur-Yll-Ylr)\div 2$$

Where DXj, DYj, DXi and DYi are elements of said two-by-two matrix and where Xll, Xlr, Xul and Xur and Yll, Ylr, Yul and Yur are X and Y coordinates of lower left, lower right, upper left and upper right corners, respectively, of said panel mapped to said two-dimensional space.

14. The computer graphics process of claim 10 wherein said panel transform is generated based on a direction of a display device and a view defined by a tracking device.

15. The computer graphics process of claim 10 wherein said processing includes the steps of:

transforming said object into said two-dimensional space;

edge-walking said object to determine whether said panel bounds said object; and shearing said object into a panel space.

16. The computer graphics process of claim 15 wherein said edge-walking includes the steps of:

finding a starting panel;

walking an edge of said object;

identifying boundary panels; and identifying interior panels.

17. The computer graphics process of claim 10 wherein said processing includes the step of transforming a vertex coordinate of said object to a panel space using a formula:

$$X\text{pixel}=Xn*DYi'-Yn*DXi'$$

$$Y\text{pixel}=-Xn*DYj'+Yn*DXj'$$

where $Xn = Xtantheta - PCX$ $Yn = Ytantheta - PCY$ and where Xpixel and Ypixel are X and Y coordinates of a vertex of said object in said panel space, PCX and PCY are X and Y coordinates of a panel center, Xtantheta and Ytantheta are X and Y coordinates of a vertex of said object in said two-dimensional space, DXi', DYi', DXj' and DYj' are components of a two-by-two matrix defined for said panel normalized by a factor 1÷(DXj*DYi−DXi*DYj) and multiplied by a size of said panel in pixels.

18. The computer graphics process of claim 10 further including the step of displaying said picture element data on said curved surface.

\* \* \* \* \*